US012783345B2

(12) United States Patent
Hu et al.

(10) Patent No.: US 12,783,345 B2
(45) Date of Patent: Nov. 3, 2026

(54) GENERATION METHOD AND SYSTEM FOR CLOSED-LOOP HUMAN ACTIVITY PROGRAM

(71) Applicant: SHENZHEN UNIVERSITY, Shenzhen (CN)

(72) Inventors: Ruizhen Hu, Shenzhen (CN); Jintian Lin, Shenzhen (CN); Xiangyu Su, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 152 days.

(21) Appl. No.: 18/964,050

(22) Filed: Nov. 29, 2024

(65) Prior Publication Data

US 2026/0111304 A1 Apr. 23, 2026

(30) Foreign Application Priority Data

Oct. 17, 2024 (CN) ......................... 202411453347.1

(51) Int. Cl.
*G06F 11/07* (2006.01)
*G06F 11/34* (2006.01)
*G06F 21/12* (2013.01)

(52) U.S. Cl.
CPC ...... *G06F 11/0793* (2013.01); *G06F 11/3438* (2013.01); *G06F 21/12* (2013.01)

(58) Field of Classification Search
CPC .. G06F 11/0793; G06F 11/3438; G06F 21/12; G06F 8/30; G06F 8/71; G06F 11/3668
See application file for complete search history.

(56) References Cited

U.S. PATENT DOCUMENTS 6,467,078 B1 * 10/2002 Matsuba ................. G06F 9/455 715/201
12,524,214 B1 * 1/2026 Liguori ................... G06F 8/425
(Continued)

OTHER PUBLICATIONS

Van Der Vegte, W. F., & Horváth, I. (2011). Achieving Closed-Loop Control Simulation of Human-Artefact Interaction: A Comparative Review. Modelling and Simulation in Engineering, 2011(1), 675405.*
(Continued)

*Primary Examiner* — Sarah Lhymn
(74) *Attorney, Agent, or Firm* — Maier & Maier, PLLC

(57) ABSTRACT

Generation method and system for closed-loop human activity program. The method involves inputting initial scene information and activity description, generating initial activity program through planner, checking verification code of corresponding action of the activity program, and sending current action to simulator for execution when the current action is executable, or modifying the activity program using verification code when the current action is unexecutable; checking execution status of the activity program, and if the corresponding action is successfully executed in simulator, obtaining post-execution status returned from the simulator, or if the corresponding action is executed unsuccessfully, modifying the activity program again using corrector according to error information returned from the simulator; and outputting the final modified activity program. The method can dynamically correct the activity program during the execution process, and greatly improve the enforceability of the activity program.

8 Claims, 5 Drawing Sheets

(56) References Cited

U.S. PATENT DOCUMENTS

| | | | | |
|---|---|---|---|---|
| 2005/0183143 | A1* | 8/2005 | Anderholm | G06F 11/3438<br>726/22 |
| 2005/0278728 | A1* | 12/2005 | Klementiev | G06F 11/3414<br>719/328 |
| 2018/0053134 | A1* | 2/2018 | Olshanetsky | G06F 11/302 |
| 2022/0357977 | A1* | 11/2022 | Kalou | G06Q 10/06393 |
| 2023/0176829 | A1* | 6/2023 | Rahmani | G06F 40/30<br>717/110 |
| 2024/0154884 | A1* | 5/2024 | Jain | H04L 43/02 |
| 2024/0201983 | A1* | 6/2024 | Groenewegen | G06F 8/20 |
| 2026/0140839 | A1* | 5/2026 | Jain | G06F 11/3006 |

OTHER PUBLICATIONS

Puig, et al.; "VirtualHome: Simulating Household Activities via Programs", 2018 IEEE/CVF Conference on Computer Vision and Pattern Recognition; 9 pages.

Liao, et al.; "Synthesizing Environment-Aware Activities via Activity Sketches", 2019 IEEE/CVF Conference on Computer Vision and Pattern Recognition (CVPR), 9 pages.

Su, et al.; "Scene-aware Activity Program Generation with Language Guidance Supplementary Material"; ACM Trans. Graph., vol. 42, No. 6, Article . Publication date: Dec. 2023; 5 pages.

Singh, et al.; "Progprompt: Generating Situated Robot Task Plans using Large Language Models"; arXiv:2209.11302v1 [cs.RO] Sep. 22, 2022; 8 pages.

Huang, et al.; "Language Models as Zero-Shot Planners: Extracting Actionable Knowledge for Embodied Agents"; Language Models as Zero-Shot Planners; 30 pages.

Song, et al.; "LLM-Planner: Few-Shot Grounded Planning for Embodied Agents with Large Language Models"; This ICCV paper is the Open Access version, provided by the Computer Vision Foundation, Except for this watermark, it is identical to the accepted version; the final published version of the proceedings is available on IEEE Xplore, 12 pages.

Shinn, et al.; "Reflexion: Language Agents with Verbal Reinforcement Learning"; 37th Conference on Neural Information Processing Systems (NeurIPS 2023); 19 pages.

Wang, et al.; "Voyager: An Open-Ended Embodied Agent with Large Language Models"; arXiv:2305.16291v2[cs.AI] Oct. 19, 2023; 42 pages.

* cited by examiner

| | Longest common subsequence | Rationality | Enforceability | Completeness |
|---|---|---|---|---|
| VH (GRU) network | 0.096 | 0.123 | 0.322 | 0.020 |
| VH (GPT-2) network | 0.324 | 0.334 | 0.385 | 0.257 |
| RAG (Two, GRU) network | 0.377 | 0.305 | 0.529 | 0.350 |
| RAG (Two, GPT-2) network | 0.343 | 0.327 | 0.472 | 0.322 |
| RAG (One, GRU) network | 0.400 | 0.348 | 0.481 | 0.339 |
| GPT-4o network | 0.375 | 0.367 | 0.202 | 0.142 |
| Scene-aware APG network | 0.515 | 0.438 | 0.746 | 0.584 |
| Network of the present disclosure | 0.518 | 0.438 | 0.993 | 0.756 |

GENERATION METHOD AND SYSTEM FOR CLOSED-LOOP HUMAN ACTIVITY PROGRAM

CROSS-REFERENCE TO RELATED APPLICATIONS

The present application claims priority to Chinese Patent Application No. 202411453347.1, filed on Oct. 17, 2024, the content of all of which is incorporated herein by reference.

FIELD

The present disclosure relates to the technical field of computer graphics, and in particular to a generation method and a generation system for closed-loop human activity program.

BACKGROUND

As the concepts of virtual universe and embodied intelligence gain popularity and evolution, there is a growing demand to build a digital world that mirrors the real one. Digital humans, as the representation of humans in the digital world, play a crucial role in interacting with virtual environments. To enable various interactive tasks, activity programs tailored to digital humans are required. Currently, many game companies design diverse activity programs for different virtual characters to enhance user immersion by making the game experience more realistic and natural. However, creating these activity programs for digital humans necessitates designers with extensive experience and specialized knowledge, which results in substantial economic and time costs. Consequently, how to reduce the cost of generating human activity programs and how to automatically create such programs in a user-friendly manner have become key issues.

Recent approaches have utilized trained models or large language models to generate human activity programs in an open-loop manner. However, these open-loop activity programs often lack high executability. Moreover, because of the open-loop nature, if an error occurs in the execution of any instruction, the activity ends, and no further error correction can be performed.

Existing closed-loop activity program generation systems fall into three main categories, the first one is about the work on human activity program generation tasks, the second one is about the work related to use closed-loop methods to complete tasks, and the third one is about the work related to use code as memory. Previous work on human activity program generation tasks is mainly divided into two types: the first type uses trained models to generate activity programs and learns from a large number of activity instruction-program pairs, and the second type employs pre-trained large language models that generate activity programs directly through prompt engineering. The second method combines the advantages of trained models and large language models by fine-tuning the large language models. However, such approaches remain open-loop in nature, once the program is generated, it cannot be altered, and if any action fails during execution, the entire task fails.

Therefore, the prior art needs to be improved.

SUMMARY

The technical problem to be solved by the present disclosure is that, in view of the defects of the prior art, the present disclosure provides a generation method and a generation system for closed-loop human activity program to solve the problem that the existing closed-loop method for generating activity programs cannot achieve automatic error correction.

The technical solution adopted by the present disclosure to solve the technical problem is as follows:

In a first aspect, the present disclosure provides a generation method for closed-loop human activity program, which includes:

Inputting initial scenario information and activity description, and generating an initial activity program through a planner;

Checking a verification code of a corresponding action of the activity program, if current action is executable, sending the current action to a simulator for execution, if the current action is unexecutable, modifying the activity program using the verification code; wherein the verification code is a code summarized according to error correction experience of the corresponding action during a model training process;

Checking an execution status of the activity program, if the corresponding action is executed successfully in a simulator, obtaining a post-execution status returned from the simulator, if the corresponding action is executed unsuccessfully, modifying the activity program again using a corrector according to an error information returned from the simulator;

Outputting a final modified activity program.

In one implementation, the checking a verification code of a corresponding action of the activity program, if current action is executable, sending the current action to a simulator for execution, if the current action is unexecutable, modifying the activity program using the verification code, includes:

Searching for the verification code of the corresponding action of the activity program in a procedural memory;

Determining, based on the searched verification code, whether the current action is executable. If the current action is determined to be unexecutable, generating a code update plan, and modifying the activity program using the verification code; if the current action is determined to be executable, sending the current action to the simulator for execution.

In one implementation, the checking an execution status of the activity program, if the corresponding action can be successfully executed in a simulator, obtaining a post-execution status returned from the simulator, if the corresponding action fails to be executed, modifying the activity program again using a corrector according to an error information returned from the simulator, includes:

Checking the execution status of the activity program to determine whether the corresponding action of the activity program can be successfully executed in the simulator;

If being executed successfully in the simulator, obtaining status change information of the simulator;

If being executed unsuccessfully in the simulator, obtaining an error information of the activity program executed in the simulator, and modifying the activity program again using the corrector according to the error information.

In one implementation, the modifying the activity program again using the corrector according to the error information includes:

Using the corrector to generate a correction plan within a set maximum number of post-execution error corrections and according to the error information of the activity program executed in the simulator, and correcting the activity program according to the correction plan to obtain an updated activity program, and continuing to execute a corresponding action instruction from an error position after obtaining the updated activity program;

Determining whether the corrected action is executed successfully;

If being executed successfully, continuing to execute a next instruction in the activity program until all instructions in the activity program are executed, or a number of post-execution error corrections reaches an upper limit.

In one implementation, the method further includes:

Obtaining, after each training, an action verification code corresponding to an action instruction executed with error in the simulator to obtain an old action verification code with defects;

Obtaining an experience information of successful error correction during a reasoning process from an error correction history information;

Outputting, by a summarizer, a new optimized action verification code based on the old action verification code with defects and the experience information of successful error correction.

In one implementation, the obtaining an experience information of successful error correction during a reasoning process from an error correction history information includes:

Obtaining an execution information of an action instruction being successfully re-executed or skipped after being executed with error, to obtain an experience information of successful error correction.

In a second aspect, the present disclosure provides a generation system for closed-loop human activity program, which includes:

A task planning module configured to input initial scenario information and activity description, and generate an initial activity program through a planner;

A pre-execution error correction module configured to check a verification code of a corresponding action of the activity program, if current action is executable, send the current action to a simulator for execution, if the current action is unexecutable, modify the activity program using the verification code; wherein the verification code is a code summarized according to error correction experience of the corresponding action during a model training process;

A post-execution error correction module configured to check an execution status of the activity program, if the corresponding action is executed successfully in a simulator, obtain a post-execution status returned from the simulator, if the corresponding action is executed unsuccessfully, modify the activity program again using a corrector according to an error information returned from the simulator; and An error correction experience summary module configured to summarize an experience of a corresponding action from being executed with error to being successful re-executed during training, and generate an inspection code of the corresponding action for pre-execution error correction during a reasoning process.

In a third aspect, the present disclosure provides a terminal, which includes: a processor and a memory, wherein the memory stores a generation program for closed-loop human activity program, and when the generation program for closed-loop human activity program is executed by the processor, the generation method for the closed-loop human activity program described in the first aspect is implemented.

In a fourth aspect, the present disclosure further provides a medium, the medium is a computer-readable storage medium, and stores a generation program for closed-loop human activity program. When the generation program for closed-loop human activity program is executed by a processor, the generation method for closed-loop human activity program described in the first aspect is implemented.

The present disclosure adopts the above technical solution to achieve the following effects:

The present disclosure generates an initial activity program through a planner, checks a verification code of a corresponding action of the activity program, and sends current action to a simulator for execution when the current action is executable, or modifies the activity program using the verification code when the current action is unexecutable. When the corresponding action is successfully executed, the present disclosure obtains a post-execution status returned from a simulator, or when the corresponding action is executed unsuccessfully, the present disclosure modifies the activity program again using a corrector according to an error information returned from the simulator, and the final modified activity program is output. The present disclosure provides a method for automatically generating an activity program in a closed-loop manner according to the activity description input by a user, which can dynamically correct the activity program during the execution process, and greatly improve the enforceability of the activity program.

BRIEF DESCRIPTION OF THE DRAWINGS

In order to more clearly illustrate the embodiments of the present disclosure or the technical solutions in the prior art, the drawings required for use in the embodiments or the description of the prior art will be briefly introduced below. Obviously, the drawings described below are only some embodiments of the present disclosure. For those skilled in the art, other drawings can be obtained based on the structures shown in these drawings without paying creative work.

The purpose, features and advantages of the present disclosure are further described with reference to the accompanying drawings in conjunction with the embodiments.

DETAILED DESCRIPTION OF EMBODIMENTS

In order to make the purpose, technical solution and advantages of the present disclosure clearer and more specific, the present disclosure is further described in detail below with reference to the accompanying drawings and embodiments. It should be understood that the embodiments described herein are only used to explain the present disclosure and are not used to limit the present disclosure.

There are three main types of existing systems that generate activity programs in a closed loop. The first type is the work of human activity program generation tasks, the second type is related work to complete tasks using a closed loop method, and the third type is related work using code as memory. In the past, there were two main types of work on human activity program generation tasks. The first type was to use a training model to generate activity programs and learn a large number of activity instruction-activity program pairs. The second method was to use a pre-trained large language model and rely on prompt engineering to directly generate activity programs. This method combines the advantages of the training model and the large language model by fine-tuning the large language model. Therefore, the existing human activity program generation methods all use an open loop method to generate activity programs, which means that once an instruction in the program fails to execute correctly, the activity ends and there is no self-correction capability.

In response to the above technical problems, an embodiment of the present disclosure provides a generation method for closed-loop human activity program, which generates an initial activity program through a planner, checks the verification code of the corresponding action of the activity program, and sends it to the simulator for execution when the current action is executable, or uses the verification code to modify the activity program when the current action is not executable; and when the corresponding action is executed successfully, obtains the post-execution status returned by the simulator, or when the corresponding action fails to execute, uses the corrector to modify the activity program again according to the error information returned by the simulator, and outputs the final modified activity program; an embodiment of the present disclosure provides a method for automatically generating an activity program in a closed-loop manner according to an activity description input by a user, which can dynamically correct the activity program during the execution process, greatly improving the enforceability of the activity program.

Figure 1:
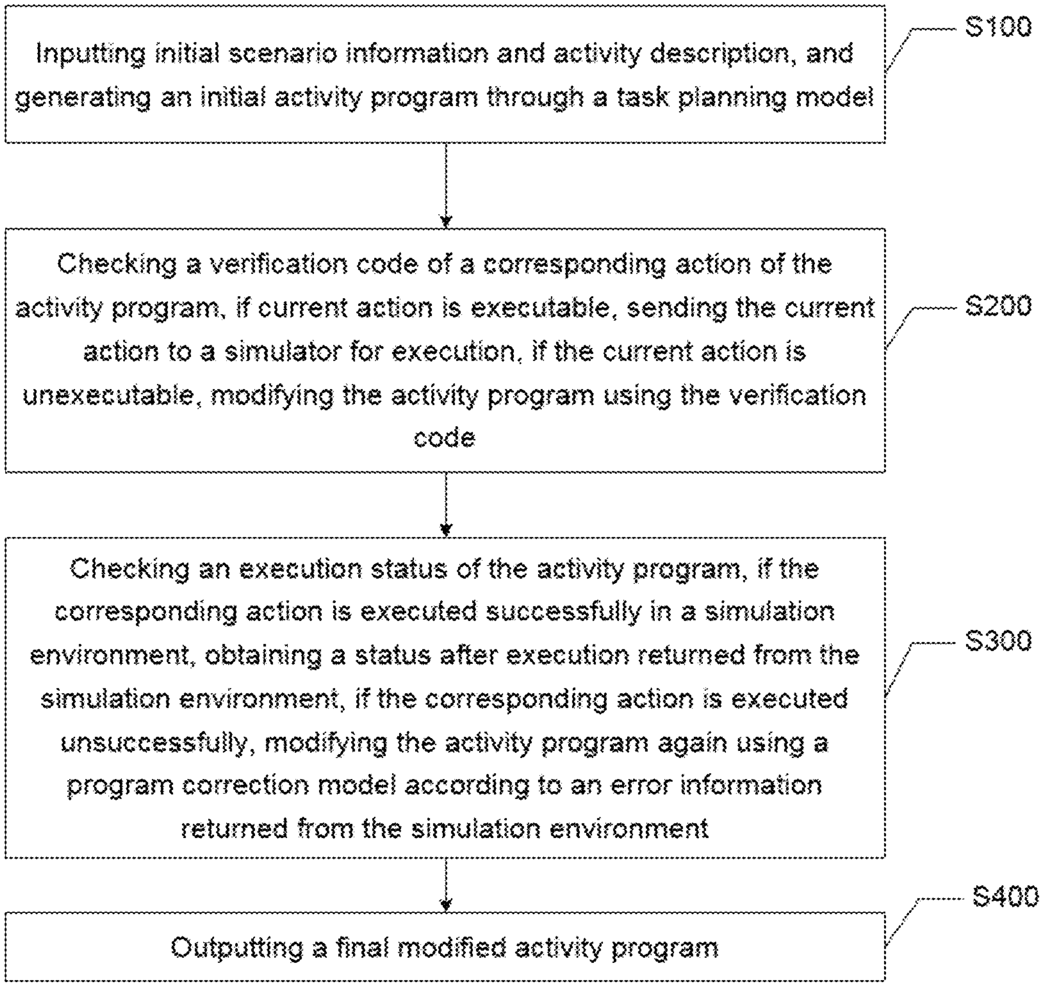
FIG. 1 is a flow chart of a generation method for closed-loop human activity program according to the present disclosure.

As shown in FIG. 1, an embodiment of the present disclosure provides a generation method for closed-loop human activity program, comprising the following steps:

Step S100, inputting initial scenario information and activity description, and generating an initial activity program through a planner.

In the present embodiment, the problem of generating human activity programs is solved. The task of the present embodiment is to enable digital humans (i.e., virtual humans) to generate reasonable and executable activity programs based on high-level descriptions given by humans (e.g., the activity description of "surfing the Internet") and the states of objects and characters in the scene; these activity programs can be composed of action instructions, which contain actions and operated objects, such as [WALK]<chair> (walking—chair), [SIT]<chair> (sitting down—chair), [SWITCHON]<computer> (turning on—computer), and other action instructions.

Based on the above task description, the method provided in the present embodiment builds a system for inputting activity instructions to generate activity programs in a closed loop, and summarizes the experience of successful error correction in the form of code, thereby realizing the function of closed-loop automatic generation of activity programs.

The system in the present embodiment provides a closed-loop framework based on a training model combined with a large language model, and uses this framework to solve the problem of generating human activity programs. The framework uses the training model to output an initial result with relatively good performance, and then uses the contextual capabilities of the large language model to correct the parts that have errors. From inputting an activity description to generate an initial activity program, to using the instructions in the activity program to execute one by one and self-correct, the system in the present embodiment has designed a complete solution process. Therefore, the method in the present embodiment, based on scene execution feedback information, uses a large language model to automatically correct activity program errors, and can summarize the error correction experience into a general, action-level code and store it for pre-execution self-correction.

In the present embodiment, the human activity program generation task requires inputting the initial scene $S_0$ and activity description D, and then outputting an activity program $P=\{I_i \vee i \in N\}$. An activity program contains Ninstructions, each instruction $I_i=[A_i, O_{i1}, O_{i2}, K_i]$ contains an action $A_i$, an object O, and a flag to determine whether to skip the instruction $K_i$. If $K_i$ is 0, it means that the instruction will be executed, and if $K_i$ is 1, it means that the instruction will be skipped.

Three models are used in the present embodiment, namely, a planner, a corrector and a summarizer.

As an example, the present embodiment uses the trained Scene aware APG (scene perception model) as the planner, which is responsible for generating the initial activity program based on the initial scene and activity description. And GPT3.5turbo is used as the corrector, which is responsible for inputting error feedback and historical execution information, and outputting the activity program correction plan. And GPT4o is used as the summarizer, which is responsible for inputting error correction history information and old defective action verification code, and outputting a new optimized action verification code.

Figure 2:
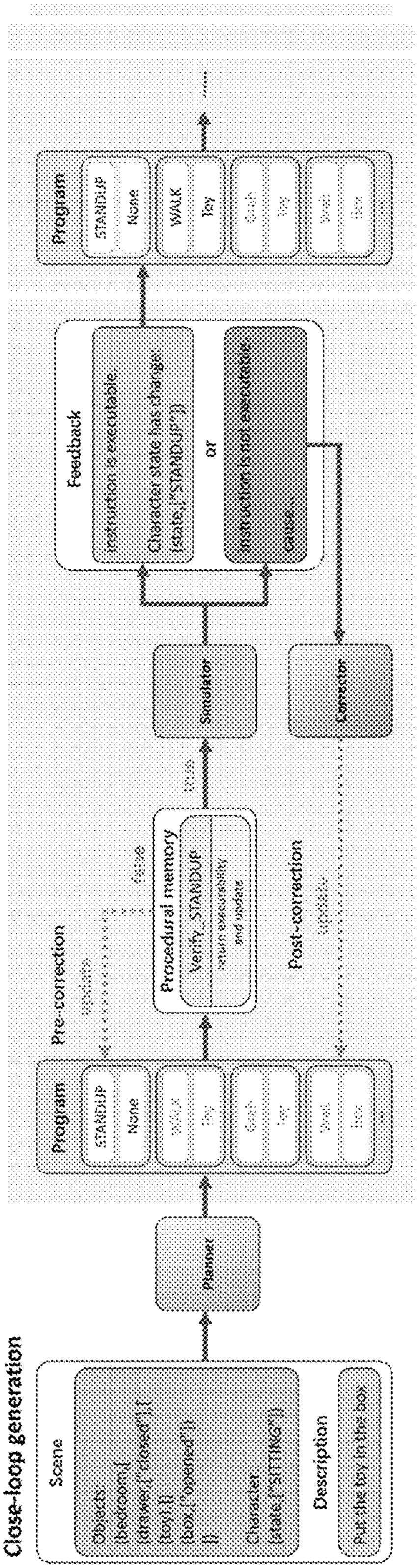
FIG. 2 is a schematic diagram of the generation of closed-loop human activity program according to the present disclosure.

As shown in FIG. 2 is the overall generation process of closed-loop human activity program. First, it is necessary to input scene information $S_0$ and activity descriptions at the initial stage of the task D, and use the planner to generate an initial activity program $P=\text{Planner}(S_0,D)$; then, the instructions in the program will be executed one by one in sequence. During this execution process, the contextual capabilities of the large language model are used to correct the execution errors, so as to achieve the process from inputting activity descriptions to generate an initial activity program, to using the instructions in the activity program to execute one by one and self-correct.

As shown in FIG. 1, an embodiment of the present disclosure provides a generation method for closed-loop human activity program, comprising the following steps:

Step S200, checking a verification code of a corresponding action of the activity program, if current action is executable, sending the current action to a simulator for execution, if the current action is unexecutable, modifying the activity program using the verification code; wherein the verification code is a code summarized according to error correction experience of the corresponding action during a model training process.

In the present embodiment, after the initial activity program is generated through the planner, in order to ensure that the activity program can run in the preset virtual environment, it is necessary to perform pre-execution error correction, that is, first use the error correction code to check whether the instruction will be executed. If the execution fails, early error correction will be performed to avoid errors.

In an implementation of the present embodiment, step S200 includes the following steps:

Step S201, searching for the verification code of the corresponding action of the activity program in a procedural memory;

Step S202, determining, based on the searched verification code, whether the current action is executable. If the current action is determined to be unexecutable, generating a code update plan, and modifying the activity program using the verification code; if the current action is determined to be executable, sending the current action to the simulator for execution.

Figure 3:
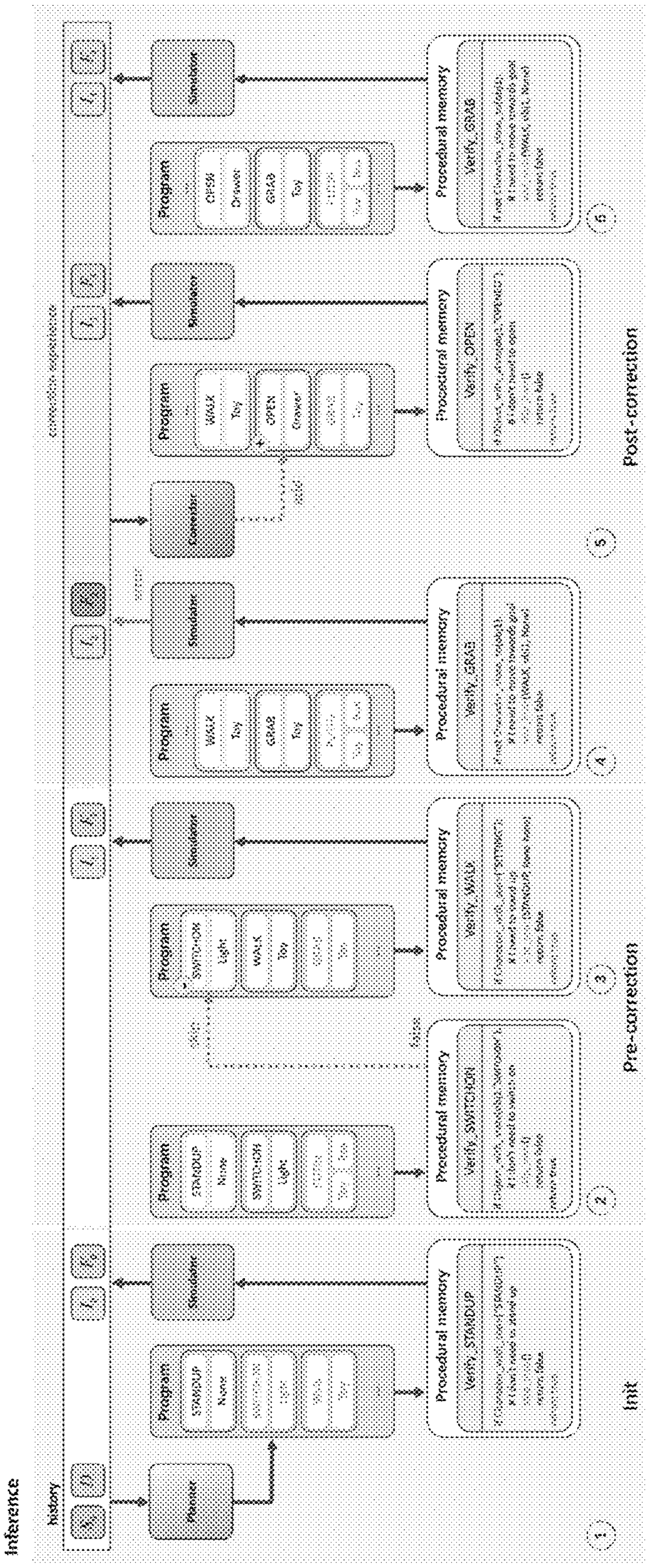
FIG. 3 is a schematic diagram of a reasoning process according to the present disclosure.

In the present embodiment, as shown in FIG. 3, an embodiment of a detailed reasoning process of the method of the present embodiment is illustrated, which includes three key stages: initialization, pre-execution error correction, and post-execution error correction.

At the initial stage of the task, an initial activity program is generated using the planner P=Planner($S_0$,D), and then the instructions in the program are executed one by one in sequence. Before each instruction is executed, a pre-execution error correction is performed, that is, according to the action in the instruction $A_i$, the corresponding check code is found from the procedural memory to determine whether error correction is required. If error correction is required, the activity program is updated according to the error correction logic of the check code, that is, the current action instruction is skipped; if error correction is not required, it is directly sent to the simulator for execution.

As an example, the process of pre-execution error correction in the present embodiment is as follows:

If the verification code determines that the instruction will fail to execute, it will generate a code update plan $\Delta P_i = V(S_i, I_i)$, use this update plan to update the activity program, and then send it to the simulator for execution. As shown in the embodiment in FIG. 2, the action instruction of the activity program is to turn on the light. The digital human intends to turn on the light, but the verification code detects that the light is already on. Therefore, the instruction to turn on the light is corrected before execution, that is, the instruction to turn on the light is marked as skipped. The instruction will be skipped and execution will continue.

In the present embodiment, during the pre-execution error correction process, if the verification code does not find any instruction error, the initial activity program is directly placed in a simulator for execution; wherein the simulator is a virtual environment simulated based on the initial scene information, for example, indoor scenes (bedroom scenes, living room scenes), outdoor scenes, and other work activity scenes.

In the present embodiment, during the process of putting the activity program into the simulator for execution, if the execution is successful in the simulator, the status change information of the simulator is obtained. If the instruction is executed incorrectly in the simulator, the simulator will provide an error feedback information F to facilitate subsequent modification of the activity program.

As shown in FIG. 1, an embodiment of the present disclosure provides a generation method for closed-loop human activity program, comprising the following steps:

Step S300, checking an execution status of the activity program, if the corresponding action is executed successfully in a simulator, obtaining a post-execution status returned from the simulator, if the corresponding action is executed unsuccessfully, modifying the activity program again using a corrector according to an error information returned from the simulator;

Step S400, outputting a final modified activity program.

Since the method provided in the present embodiment uses a closed-loop approach to generate an activity program, during the execution of the activity program, if the execution is successful in the simulator, the status change information of the simulator is obtained. If an instruction is executed incorrectly, the large language model (i.e., the GPT3.5turbo corrector) is used to update the activity program to correct the error. In addition, the present embodiment provides a code-based memory model. Once the error correction is successful, the error correction logic is recorded so that the activity program can be optimized further based on the recorded error correction information.

In an implementation of the present embodiment, step S300 includes the following steps:

Step S301, checking the execution status of the activity program to determine whether the corresponding action of the activity program can be successfully executed in the simulator;

Step S302, if being executed successfully in the simulator, obtaining status change information of the simulator;

Step S303: if being executed unsuccessfully in the simulator, obtaining an error information of the activity program executed in the simulator, and modifying the activity program again using the corrector according to the error information.

In an implementation of the present embodiment, the step S303 of modifying the activity program again according to the error information using the corrector includes:

Step S303*a*, using the corrector to generate a correction plan within a set maximum number of post-execution error corrections and according to the error information of the activity program executed in the simulator, and correcting the activity program according to the correction plan to obtain an updated activity program, and continuing to execute a corresponding action instruction from an error position after obtaining the updated activity program;

Step S303*b*, determining whether the corrected action is executed successfully;

Step S303*c*: if being executed successfully, continuing to execute a next instruction in the activity program until all instructions in the activity program are executed, or a number of post-execution error corrections reaches an upper limit.

In the present embodiment, in the simulator, if the execution of the activity instruction fails, the large language model is used as a corrector based on the execution error information to output the post-execution correction plan of the activity program, and the correction plan is used to update the activity program to correct the error. If the execution is successful, the next instruction in the program is executed. The activity ends until all the instructions in the activity program are executed, or the number of post-execution error corrections reaches the upper limit.

In the present embodiment, the main reason for the execution error is that the action does not match the scene state. For example, if the character is already in a standing state, executing [STANDUP] will result in an execution error; for another example, if an apple is in a closed container, executing [GRAB]<apple> will result in an execution error. The error correction method in the present embodiment is to skip the current redundant instructions (for example, if the character is already in a standing state, the standing instruction should be skipped), or to insert some additional instructions before the wrong instruction so that the original wrong instruction can be successfully executed (for example, before the instruction to grab an object in a closed container, insert an instruction to open the container).

As an example, the process of post-execution error correction in the present embodiment is as follows:

If the verification code does not find an error in the instruction, it is directly put into the simulator for execution. During the execution of the activity program, the corrector is used in the present embodiment to input historical execution information, output a modification plan for the activity program $\Delta P_i$=Corrector($S_0$, D, [$I_0$, $F_0$], . . . [$I_i$, $F_i$]), and then use the modification plan to update the activity program. After the update, the execution continues from the error position. As shown in FIG. 3, in the embodiment in FIG. 3, the digital human intends to grab a toy in a drawer, but the drawer is closed, so the execution fails. Then the corrector inserts an instruction to open the drawer, and the subsequent execution can continue successfully.

In an implementation of the present embodiment, the embodiment of the present disclosure provides a generation method for closed-loop human activity program, which also includes the following steps:

Step S501, obtaining, after each training, an action verification code corresponding to an action instruction executed with error in the simulator to obtain an old action verification code with defects;

Step S502, obtaining an experience information of successful error correction during a reasoning process from an error correction history information;

In one implementation of the present embodiment, the experience information of successful error correction in the reasoning process is obtained from the error correction history information, including: obtaining the execution information of the action instruction from the execution error to the successful re-execution or skipping, and obtaining the experience information of successful error correction.

Step S503: outputting, by a summarizer, a new optimized action verification code based on the old action verification code with defects and the experience information of successful error correction.

Figure 4:
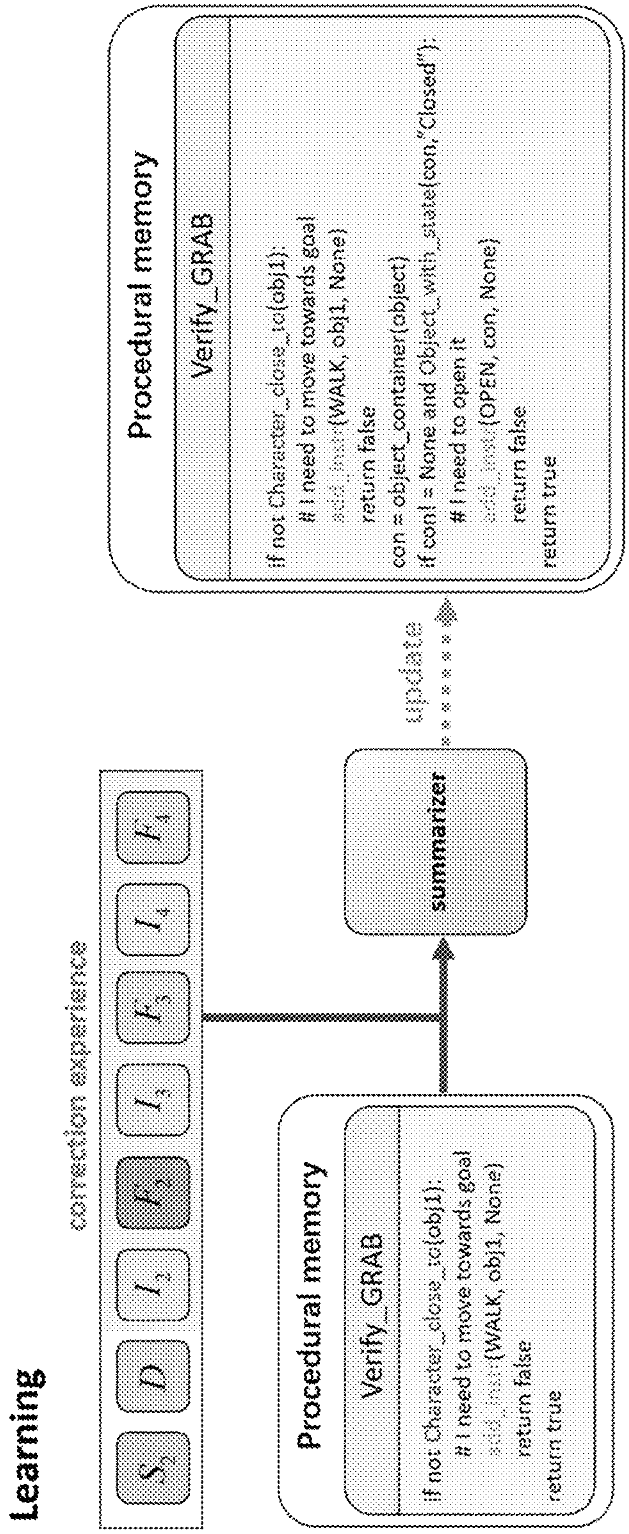
FIG. 4 is a schematic diagram of a learning process according to the present disclosure.

In the present embodiment, as shown in FIG. 4, an example of a learning process of the method provided in the present embodiment is shown in FIG. 4.

After each training session, if an instruction is executed incorrectly in the simulator, it means that the action verification code corresponding to the instruction is defective and the error is not found and corrected. Initially, for each action, the experience of successful error correction during the training process is collected (the experience of error correction refers to the process from an error in the execution of an action to the successful re-execution/skipping of the action), and the summarizer is used to optimize the action verification code $V_{new}$=Summarizer($S_j$, D, [$I_j$, $F_j$], . . . [$I_i$, $F_i$], $V_{old}$). In this way, the method provided in the present embodiment has the ability of autonomous learning, and can continuously optimize the verification code to update the program before the execution error occurs to avoid errors, greatly improving execution efficiency.

As shown in FIG. 3, the example provided in FIG. 3 shows that the code for checking the grasping action does not have the logic to check whether the object to be grasped is placed in a closed container, so the execution fails. After the failure, the program inserts the instruction to open the container by adopting the reasoning of the corrector, and then re-executes the grasping instruction successfully. As shown in FIG. 4, this error correction experience is input into the summarizer, and the action verification code is optimized so that it has the logic to check whether the object is placed in a closed container, and has the corresponding error correction means.

The experiment in the present embodiment is divided into a training phase and a testing phase. The training phase allows learning after inference, while the testing phase does not. In the training phase, 100 samples are randomly selected from the training set, and inference and learning are performed on the 100 samples.

The method in the present embodiment was experimented on a virtual home simulator. The main evaluation indicators of the task were the rationality and executability of the activity program. Rationality refers to the relevance between the activity program and the activity description at the semantic level, while executability refers to whether the activity program can be successfully executed in the target scenario instance.

Figures 5, 6:
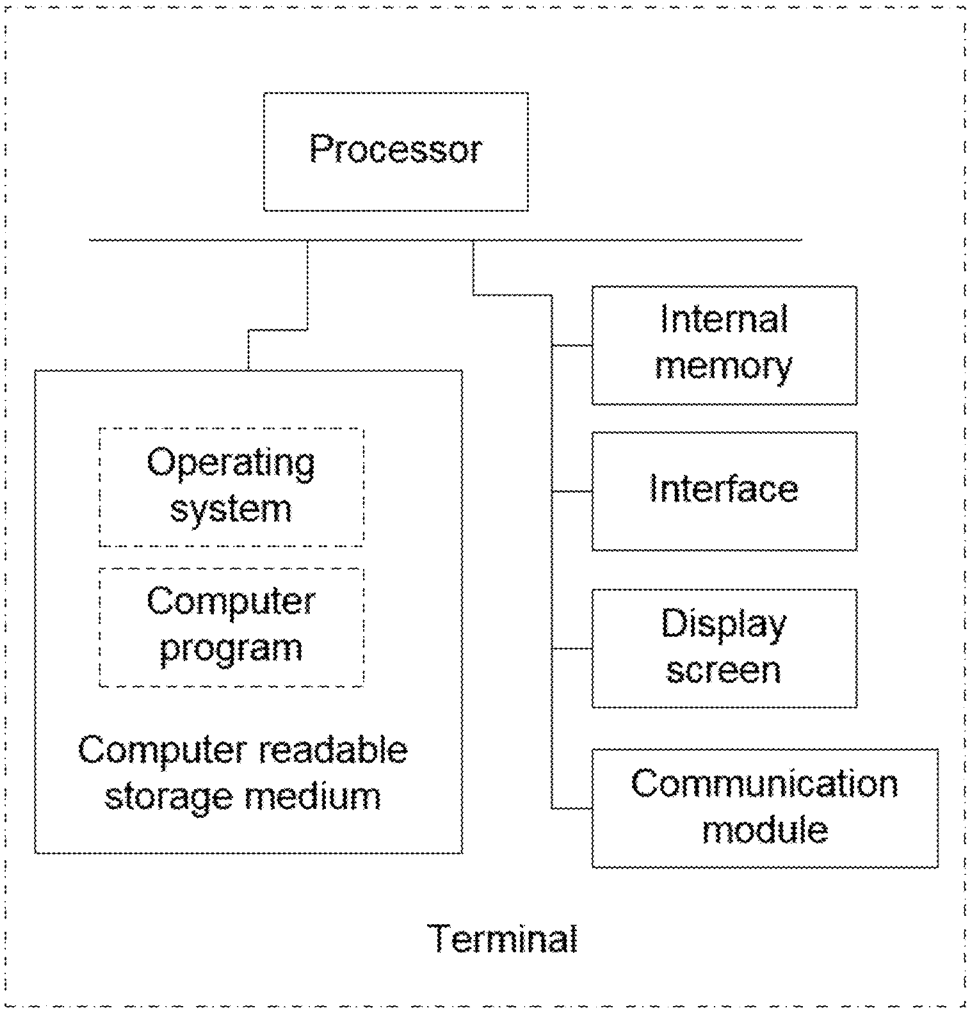
FIG. 5 is a schematic diagram of test results according to the present disclosure.
FIG. 6 is a functional schematic diagram of a terminal according to an embodiment of the present disclosure.

The present embodiment randomly selected 100 samples from the original training set for learning, and tested them on the complete 2415 samples in the test set. As shown in FIG. 5, the test results prove that based on the current best method, Scene aware APG, adding the method in the present embodiment can improve the executability from 0.767 to 0.993 and the completion from 0.573 to 0.756, which has a significant improvement in error correction capability.

It is worth mentioning that the task planning module in the present embodiment can have different network implementations. In the present embodiment, Scene aware APG is adopted as the network. In other implementations, it can be replaced with some other networks, such as RAG, or GPT4, etc. The program correction module and the experience summary module can also be replaced with other large language models, such as GPT3, GPT4 and other versions. These replacement solutions based on the present embodiment should all fall within the protection scope of the present embodiment.

The present embodiment achieves the following technical effects through the above technical solution:

The present embodiment generates an initial activity program through a planner, and checks the verification code of the corresponding action of the activity program, and sends it to the simulator for execution when the current action is executable, or uses the verification code to modify the activity program when the current action is not executable; and when the corresponding action is executed successfully, obtains the post-execution status returned by the simulator, or when the corresponding action fails to execute, uses the corrector to modify the activity program again according to the error information returned by the simulator, and outputs the final modified activity program; the present embodiment provides a method for automatically generating an activity program in a closed-loop manner according to the activity description input by the user, which can dynamically correct the activity program during the execution process, thereby greatly improving the enforceability of the activity program.

The present disclosure also provides a generation system for closed-loop human activity program, which includes:

A task planning module configured to input initial scenario information and activity description, and generate an initial activity program through a planner;

A pre-execution error correction module configured to check a verification code of a corresponding action of the activity program, if current action is executable, send the current action to a simulator for execution, if the current action is unexecutable, modify the activity program using the verification code; wherein the verification code is a code summarized according to error correction experience of the corresponding action during a model training process;

A post-execution error correction module configured to check an execution status of the activity program, if the corresponding action is executed successfully in a simulator, obtain a post-execution status returned from the simulator, if the corresponding action is executed unsuccessfully, modify the activity program again using a corrector according to an error information returned from the simulator; and An error correction experience summary module configured to summarize an experience of a corresponding action from being executed with error to being successful re-executed during training, and generate an inspection code of the corresponding action for pre-execution error correction during a reasoning process.

The present embodiment achieves the following technical effects through the above technical solution:

The present embodiment generates an initial activity program through a planner, and checks the verification code of the corresponding action of the activity program, and sends it to the simulator for execution when the current action is executable, or uses the verification code to modify the activity program when the current action is not executable; and when the corresponding action is executed successfully, obtains the post-execution status returned by the simulator, or when the corresponding action fails to execute, uses the corrector to modify the activity program again according to the error information returned by the simulator, and outputs the final modified activity program; the present embodiment provides a method for automatically generating an activity program in a closed-loop manner according to the activity description input by the user, which can dynamically correct the activity program during the execution process, thereby greatly improving the enforceability of the activity program.

Based on the above embodiments, the present disclosure further provides a terminal, a principal block diagram of which may be shown in FIG. 6.

The terminal includes: a processor, a memory, an interface, a display screen and a communication module connected through a system bus; wherein the processor of the terminal is used to provide computing and control capabilities; the memory of the terminal includes a storage medium and an internal memory; the storage medium stores an operating system and a computer program; the internal memory provides an environment for the operation of the operating system and the computer program in the storage medium; the interface is used to connect to external devices; the display screen is used to display corresponding information; and the communication module is used to communicate with a cloud server or other devices.

When the computer program is executed by a processor, it is used to implement the operation of the generation method for closed-loop human activity program.

Those skilled in the art will understand that the principal block diagram shown in FIG. 6 is only a block diagram of a partial structure related to the solution of the present disclosure, and does not constitute a limitation on the terminal to which the solution of the present disclosure is applied. The specific terminal may include more or fewer components than shown in the figure, or combine certain components, or have a different arrangement of components.

In one embodiment, a terminal is provided, which includes: a processor and a memory, wherein the memory stores a generation program for closed-loop human activity program, and when the generation program for closed-loop human activity program is executed by the processor, it is used to implement the operation of the generation method for closed-loop human activity program as described above.

In one embodiment, a storage medium is provided, wherein the storage medium stores a generation program for closed-loop human activity program, and when the generation program for closed-loop human activity program is executed by a processor, it is used to implement the operations of the generation method for closed-loop human activity program as described above.

Those skilled in the art can understand that all or part of the processes in the above-mentioned embodiments can be implemented by instructing related hardware through a computer program, and the computer program can be stored in a non-volatile storage medium. When the computer program is executed, it can include the processes of the embodiments of the above-mentioned methods. Among them, any reference to memory, storage, database or other media used in the embodiments provided by the present disclosure can include non-volatile and volatile memory.

In summary, the present disclosure provides a generation method for closed-loop human activity program and system, including: inputting initial scene information and activity description, generating an initial activity program through a planner; checking the verification code of the action corresponding to the activity program, if it is determined that the current action is executable, sending it to the simulator for execution, if it is determined that the current action is not executable, using the verification code to modify the activity program; checking the execution status of the activity program, if the corresponding action can be successfully executed in the simulator, obtaining the execution status returned by the simulator, if the corresponding action fails to execute, according to the error information returned by the simulator, using the corrector to modify the activity program again; outputting the final modified activity program. The present disclosure provides a method for automatically generating an activity program in a closed-loop manner according to the activity description input by the user, which can dynamically correct the activity program during the execution process, greatly improving the executable nature of the activity program.

It should be understood that the application of the present disclosure is not limited to the above examples. For ordinary technicians in this field, improvements or changes can be made based on the above description. All these improvements and changes should fall within the scope of protection of the claims attached to the present disclosure.

What is claimed is:

1. A generation method for closed-loop human activity program, comprising:

inputting initial scenario information and activity description, and generating an initial activity program through a planner;

checking a verification code of a corresponding action of the activity program, if current action is executable, sending the current action to a simulator for execution, if the current action is unexecutable, modifying the activity program using the verification code; wherein the verification code is a code summarized according to error correction experience of the corresponding action during a model training process; and checking an execution status of the activity program, if the corresponding action is executed successfully in a simulator, obtaining a post-execution status returned from the simulator, if the corresponding action is executed unsuccessfully, modifying the activity program again using a corrector according to an error information returned from the simulator;

outputting a final modified activity program.

2. The generation method for closed-loop human activity program according to claim 1, wherein the checking a verification code of a corresponding action of the activity program, if current action is executable, sending the current action to a simulator for execution, if the current action is unexecutable, modifying the activity program using the verification code, comprises:

searching for the verification code of the corresponding action of the activity program in a procedural memory; and determining, based on the searched verification code, whether the current action is executable, If the current action is determined to be unexecutable, generating a code update plan, and modifying the activity program using the verification code; if the current action is determined to be executable, sending the current action to the simulator for execution.

3. The generation method for closed-loop human activity program according to claim 1, wherein checking an execution status of the activity program, if the corresponding action can be successfully executed in a simulator, obtaining a post-execution status returned from the simulator, if the corresponding action fails to be executed, modifying the activity program again using a corrector according to an error information returned from the simulator, comprises:

checking the execution status of the activity program to determine whether the corresponding action of the activity program can be successfully executed in the simulator;

if being executed successfully in the simulator, obtaining status change information of the simulator; and if being executed unsuccessfully in the simulator, obtaining an error information of the activity program executed in the simulator, and modifying the activity program again using the corrector according to the error information.

4. The generation method for closed-loop human activity program according to claim 3, wherein the modifying the activity program again using the corrector according to the error information comprises:

using the corrector to generate a correction plan within a set maximum number of post-execution error corrections and according to the error information of the activity program executed in the simulator, and correcting the activity program according to the correction plan to obtain an updated activity program, and continuing to execute a corresponding action instruction from an error position after obtaining the updated activity program;

determining whether the corrected action is executed successfully; and if being executed successfully, continuing to execute a next instruction in the activity program until all instructions in the activity program are executed, or a number of post-execution error corrections reaches an upper limit.

5. The generation method for closed-loop human activity program to claim 1, wherein the method further comprises:

obtaining, after each training, an action verification code corresponding to an action instruction executed with error in the simulator to obtain an old action verification code with defects;

obtaining an experience information of successful error correction during a reasoning process from an error correction history information; and outputting, by a summarizer, a new optimized action verification code based on the old action verification code with defects and the experience information of successful error correction.

6. The generation method for closed-loop human activity program according to claim 5, wherein the obtaining an experience information of successful error correction during a reasoning process from an error correction history information comprises:

obtaining an execution information of an action instruction being successfully re-executed or skipped after being executed with error, to obtain an experience information of successful error correction.

7. A generation system for closed-loop human activity program, comprising:

a task planning module configured to input initial scenario information and activity description, and generate an initial activity program through a planner;

a pre-execution error correction module configured to check a verification code of a corresponding action of the activity program, if current action is executable, send the current action to a simulator for execution, if the current action is unexecutable, modify the activity program using the verification code; wherein the verification code is a code summarized according to error correction experience of the corresponding action during a model training process;

a post-execution error correction module configured to check an execution status of the activity program, if the corresponding action is executed successfully in a simulator, obtain a post-execution status returned from the simulator, if the corresponding action is executed unsuccessfully, modify the activity program again using a corrector according to an error information returned from the simulator; and an error correction experience summary module configured to summarize an experience of a corresponding action from being executed with error to being successful re-executed during training, and generate an inspection code of the corresponding action for pre-execution error correction during a reasoning process.

8. A terminal, comprising a processor and a memory, wherein a generation program for closed-loop human activity program is stored in the memory, and when the generation program for closed-loop human activity program is executed by the processor, the generation method for closed-loop human activity program according to claim 1 is implemented.

* * * * *